Patented Feb. 8, 1949

2,461,278

UNITED STATES PATENT OFFICE 2,461,278

STANDARDIZATION OF THERAPEUTIC
CURARE PREPARATIONS

Horace A. Holaday, Highland Park, N. J., assignor to E. R. Squibb & Sons, New York, N. Y., a corporation of New York; dedicator to the People of the United States No Drawing. Application December 13, 1945,
Serial No. 634,898

11 Claims. (Cl. 167—67)

This application is a continuation-in-part of my application Serial No. 396,871, filed June 6, 1941 (now Patent No. 2,397,417, dated March 26, 1946).

This invention relates to, and has for its object the provision of, stable, physiologically-standardized curare preparations suitable for therapeutic use, and a simple and efficient method of producing them.

Curare is a valuable agent for the treatment of dystonic and spastic conditions, and for the prevention of spinal and extremity fractures in the metrazol (pentamethylenetetrazol) and electroshock therapy of mental conditions; but its use has been limited because stable, physiologically-standardized preparations thereof suitable for therapeutic use—particularly by intravenous injection—have heretofore been unobtainable. The difficulty of providing curare preparations of constant activity and action is due to the fact that commercial (crude) curare is a variable and physically unstable mixture. Since curare's margin of safety (the range of dosage between that giving the desired skeletal-muscle effect and that giving the undesirable toxic paralysis of the muscles of respiration) is small, it is manifestly essential for therapeutic utility that the curare preparation be stable and of accurate potency.

In accordance with this invention, stable, physiologically-standardized curare preparations suitable for therapeutic use are prepared by a method essentially comprising extracting substantially dry—preferably desiccated—crude curare with a substantially dry, volatile, organic curare-solvent (i. e., solvent for curare), transferring the extracted material to aqueous solution, purifying the solution with an activated carbon, assaying the solution for curare-effect activity, and adjusting the solution to the desired potency. The purification treatment removes inert material and material having undesirable physiological properties; and the thus-purified curare is highly active, and forms a stable aqueous solution (i. e., the solution remains clear).

Preferably, the crude curare is first extracted with cold water, the water evaporated, and the completely dry residue subjected to extraction with a dry, volatile, organic curare-solvent; the preliminary water extraction serving to prevent extraction by the organic solvent of water-insoluble impurities. Preferably, also, the dry, volatile, organic curare-solvent is an anhydrous lower-aliphatic, monohydric alcohol, and the extraction is effected at an elevated temperature. The utilizable solvents include, inter alia, substantially dry—preferably anhydrous—methanol, isopropanol, and especially ethanol (or a methanol-denatured alcohol).

The following example is illustrative of the invention:

A. *Standardization of the curare solution*

A sample of a solution of purified curare, obtained (for example) by the procedure described under the heading "A. Purification of crude curare" in my Patent No. 2,397,417, is assayed to determine its curare-effect activity in terms of a suitable standard material. For this purpose, the following specific, rapid, and quantitative method of biological assay has been devised.

The method is based on the observation that injection of a curare preparation into a readily accessible vein of a mammal (e. g., the ear vein of a rabbit) will produce a temporary paralysis of the skeletal muscles (e. g., the muscles of the head and neck and extremities of the rabbit) without paralyzing the respiratory muscles, and if the dose and rate of injection is properly controlled these muscles will reach a degree of flaccidity after injection has been continued for a certain time (e. g., 4–7 minutes in the case of rabbits) which just prevents the mammal from using them while suitably positioned (e. g., prevents the rabbit from raising its head when tied belly-down on an animal board).

When a rabbit is tied belly-down on an animal board it normally holds its head up. The curare preparation is injected into the ear vein at a slow, constant rate (e. g., 0.10 cc. every 15 seconds) until the rabbit's head begins to drop; then the rate is reduced (e. g., to 0.05 cc. every 15 seconds) until the rabbit's head rests on the board and the rabbit is unable to raise its head even when stimulated. The paralysis is of short duration (8–15 minutes).

Since the doses of curare required by different rabbits vary as much as 150%, but the dose of curare required by each rabbit for tests on successive days remains constant, the rabbits are "crossed-over" to obtain a reliable assay. Thus, the curare preparation to be assayed is tested one day on at least 8 rabbits, and an equal number are subjected to the test using a solution of the reference standard. On the following day, the rabbits are crossed-over, i. e., those which were injected with the standard are now injected with the preparation to be assayed, and vice versa. The activity ratio of the sample to be assayed to the reference standard is calculated directly from the corresponding volumes of test sample and reference standard required in each rabbit. The probable error of the average of 16 ratios is usually less than 2%. The accuracy of this biological standardization has received ample clinical confirmation.

Using the foregoing cross-over rabbit-head-drop test, the activity of the reference standard curare may be related to that of a definite chemical compound, e. g., quinine methochloride, or (preferably) d-tubocurarine chloride. Thus, the dried crude curare used as a reference standard was found to have 5.26 times the activity of quinine methochoride and .15 the activity of d-tubocurarine chloride (pentahydrate); and a unit of activity was considered to be the amount of activity in the aqueous extract of 1 mg. of this reference standard curare.

Preferably, the activity of the curare preparation to be assayed is adjusted to approximately 2 units per cc. (on the basis of a preliminary test with standardized rabbits), so that volumes, activity and injection-interval are nearly the same for both the preparation to be assayed and the reference standard. By "standardized" rabbits is meant rabbits which have been injected with the reference standard to determine their respective "head-drop" doses. Preferably also, each rabbit employed in the assay of this invention is subjected to at least two "priming" doses before use (it having been found that, with the same curare preparation and rabbit, the first and second "head-drop" doses differ significantly from the third and subsequent doses, which are substantially constant).

Although the rabbit is the animal of choice for the curare assay of this invention (because of the sharpness of the end point, and because the marginal ear vein of the rabbit readily permits of frequent injections), satisfactory assays can be carried out in any other mammalian laboratory-test animal (which can be intravenously injected), including the mouse, rat, dog, cat, monkey. Any sign of relaxation of specific muscle groups may be chosen as the end-point, for example, ptosis in the monkey or human, or relaxation of the jaw in dogs. For the reasons given hereinbefore in connection with the rabbit assay, it is necessary to make a comparison of the test sample with the standard preparation in each mammal, preferably by the "cross-over" pattern. Due to differences in body weight of, and in unit-weight dosage for, the different species, appropriate adjustment of concentration and rate must be made. The following details of assays in other mammals further illustrate this invention:

(1) Mice are held by the tail extended through a notched stopper in a glass cylinder, and injected with the curare preparations (adjusted to about 0.64 unit/cc.) via the tail vein at the rate of 0.005 cc./10 seconds (by use of a micrometer syringe, or other device suitable for slow injection), the injection being continued until the mouse's head falls heavily when raised with a probe. The "cross-over" pattern is followed.

(2) Dogs are tied loosely on their sides (on a table) and injected with the curare preparations (adjusted to about 2 units/cc.) via the cephalic or the saphenous vein at the rate of 3 cc. per minute, the injection being continued until the lateral muscles of the neck and the muscles of the jaw are paralyzed. At that time, the dog's head drops quickly to the table when released from a position of lateral rotation, and the teeth click sharply as the head strikes the table. The "cross-over" pattern is followed.

The assay of this invention may be used for the standardization of solutions of the compound d-tubocurarine chloride, as well as solutions of such similarly-acting compounds derived from crude curare as d-chondocurine dimethochloride and d-tubocurarine dimethyl ether iodide, all such compounds being comprehended herein (along with curare) by the term "curare-drug."

B. *Production of a therapeutic curare preparation*

The purified and standardized curare solution is diluted with the volume of a saline-diluent solution containing a preservative (preferably chlorbutanol) required to produce a physiological saline preparation of the desired activity. For example, the sodium chloride and chlorbutanol contents of the diluent are adjusted so that the finished preparation will contain 0.5% chlorbutanol and about 0.5% sodium chloride; and the activity is made equivalent to that of an aqueous solution containing 20 mg./cc. of the reference standard curare. The resulting preparation is filtered through a stone filter candle and tested for sterility, and is then ready for therapeutic use. It is a sterile, stable, physiologically-standardized aqueous solution of curare. Since the preparation (usually) contains less than 0.4 (or even 0.33) mg. solids per unit of activity (as herein defined) compared with about 1.0 (or even 0.67) mg. solids per unit of activity in the crude drug, the purified curare is over 100% more active than the crude drug. The therapeutic utility of this preparation has been amply confirmed by clinical tests.

The invention may be variously otherwise embodied within the scope of the appended claims.

I claim:

1. In the production of a physiologically-standardized curare-drug preparation, assaying the curare-drug by determining the relative volumes of aqueous solutions of the test sample and of a reference standard required to produce the same temporary paralysis of muscles of a mammalian laboratory-tested animal when slowly injected intravenously into the same animal under the same conditions at different times, the animal being permitted to recover from one injection before being subjected to the other injection, and making up a preparation of the desired activity from the assayed curare-drug in accordance with the assay results.

2. In the production of a physiologically-standardized curare preparation, assaying the curare by determining the relative volumes of aqueous solutions of the test curare and of a reference standard curare required to produce the same temporary paralysis of muscles of a mammalian laboratory-test animal when slowly injected intravenously into the same animal under the same conditions at different times, the animal being permitted to recover from one injection before being subjected to the other injection, and making up a preparation of the desired activity from the assayed curare in accordance with the assay results.

3. In the production of a physiologically-standardized curare preparation, assaying the curare by determining the relative volumes of aqueous solutions of the test curare and of a reference standard curare required to produce the same temporary paralysis of a rabbit's neck muscles when slowly injected into an ear vein of the same rabbit under the same conditions at different times, the rabbit being permitted to recover from one injection before being subjected to the other injection, and making up a preparation of the desired activity from the assayed curare in accordance with the assay results.

4. In the production of a physiologically-standardized curare preparation, assaying the curare by determining the relative volumes of aqueous solutions of the test curare and of a reference standard curare required to produce the same temporary paralysis of a dog's neck and jaw muscles when slowly injected intravenously into the same dog under the same conditions at different times, the dog being permitted to recover from one injection before being subjected to the other injection, and making up a preparation of the desired activity from the assayed curare in accordance with the assay results.

5. In the production of a physiologically-standardized curare preparation, assaying the curare by determining the relative volumes of aqueous solutions of the test curare and of a reference standard curare required to produce the same temporary paralysis of a mouse's neck muscles when slowly injected intravenously into the same mouse under the same conditions at different times, the mouse being permitted to recover from one injection before being subjected to the other injection, and making up a preparation of the desired activity from the assayed curare in accordance with the assay results.

6. In the production of a physiologically-standardized curare-drug preparation, assaying the curare drug by (I) determining the volumes of an aqueous solution of the test sample and of an aqueous solution of the reference standard required to produce in mammalian laboratory-test animals A and B, respectively, the same temporary paralysis of the skeletal muscles when slowly injected intravenously under the same conditions, and (II), after the animals have recovered from said injections, repeating the determination with the animals A and B crossed-over, and making up a preparation of the desired activity from the assayed curare-drug in accordance with the assay results.

7. In the production of a physiologically-standardized curare preparation, assaying the curare by (I) determining the volumes of an aqueous solution of the test curare and of an aqueous solution of the reference standard curare required to produce in mammalian laboratory-test animals A and B, respectively, the same temporary paralysis of the skeletal muscles when slowly injected intravenously under the same conditions, and (II), after the animals have recovered from said injections, repeating the determination with the animals A and B crossed-over and making up a preparation of the desired activity from the assayed curare in accordance with the assay results.

8. In the production of a physiologically-standardized curare preparation, assaying the curare by (I) determining the volumes of an aqueous solution of the test curare and of an aqueous solution of the reference standard curare required to produce in rabbits A and B, respectively, the same temporary paralysis of the neck muscles when slowly injected intravenously under the same conditions, and (II), after the rabbits have recovered from said injections, repeating the determination with the rabbits A and B crossed-over, and making up a preparation of the desired activity from the assayed curare in accordance with the assay results.

9. In the production of a physiologically-standardized curare preparation, assaying the curare by (I) determining the volumes of an aqueous solution of the test curare and of an aqueous solution of the reference standard curare required to produce in groups A and B, respectively, of rabbits the same temporary paralysis of the neck muscles when slowly injected intravenously under the same conditions, and (II), after the rabbits have recovered from said injections, repeating the determination with the groups A and B crossed-over, and making up a preparation of the desired activity from the assayed curare in accordance with the assay results.

10. In the production of a physiologically-standardized curare preparation, assaying the curare by (I) determining the volumes of an aqueous solution of the test curare and of an aqueous solution of the reference standard curare required to produce in dogs A and B, respectively, the same temporary paralysis of the neck and jaw muscles when slowly injected intravenously under the same conditions, and (II), after the dogs have recovered from said injections, repeating the determination with the dogs A and B crossed-over, and making up a preparation of the desired activity from the assayed curare in accordance with the assay results.

11. In the production of a physiologically-standardized curare preparation, assaying the curare by (I) determining the volumes of an aqueous solution of the test curare and of an aqueous solution of the reference standard curare required to produce in mice A and B, respectively, the same temporary paralysis of the neck muscles when slowly injected intravenously under the same conditions, and (II), after the mice have recovered from said injections, repeating the determination with the mice A and B crossed-over, and making up a preparation of the desired activity from the assayed curare in accordance with the assay results.

HORACE A. HOLADAY.

REFERENCES CITED

The following references are of record in the file of this patent:

Pharmacopoeia of U. S., 11th revision, Mack Printing Co., 1941, page 148.

Munch, "Bioassays," Williams and Wilkins Co., 1931, pages 158–163.